US010241384B2

(12) United States Patent
Takagi et al.

(10) Patent No.: US 10,241,384 B2
(45) Date of Patent: Mar. 26, 2019

(54) WAVELENGTH CONVERSION ELEMENT, LIGHT SOURCE DEVICE, AND PROJECTOR

(71) Applicant: SEIKO EPSON CORPORATION, Tokyo (JP)

(72) Inventors: Kunihiko Takagi, Okaya (JP); Ayumu Kobayashi, Matsumoto (JP); Tomohiro Yokoo, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/047,746

(22) Filed: Jul. 27, 2018

(65) Prior Publication Data

US 2019/0041732 A1 Feb. 7, 2019

(30) Foreign Application Priority Data

Aug. 3, 2017 (JP) ................................. 2017-150598

(51) Int. Cl.
| | |
|---|---|
| *G03B 21/20* | (2006.01) |
| *G02B 27/10* | (2006.01) |
| *F21V 9/30* | (2018.01) |

(52) U.S. Cl.
CPC .............. *G03B 21/204* (2013.01); *F21V 9/30* (2018.02); *G02B 27/1006* (2013.01)

(58) Field of Classification Search
CPC ... F21V 9/16; F21V 29/50; F21V 7/22; F21V 9/64; F21V 29/70; C23C 14/16; C23C 14/34; C23C 14/30; F21Y 2115/30; G02B 5/08; G02B 1/11; C09K 11/00
See application file for complete search history.

(56) References Cited

U.S. PATENT DOCUMENTS

| | | | |
|---|---|---|---|
| 2016/0077415 A1* | 3/2016 | Motoya ................ | G03B 21/204 353/84 |
| 2018/0080615 A1 | 3/2018 | Inoue et al. | |

FOREIGN PATENT DOCUMENTS

| | | |
|---|---|---|
| JP | 2015-119046 A | 6/2015 |
| JP | 2016-192295 A | 11/2016 |
| WO | 2015194455 A1 | 12/2015 |

* cited by examiner

*Primary Examiner* — Cara E Rakowski
*Assistant Examiner* — Danell L Owens
(74) *Attorney, Agent, or Firm* — Oliff PLC

(57) ABSTRACT

A wavelength conversion element includes a wavelength conversion layer which has a first face on which an excitation light is incident and a second face facing the first face, a first layer which is provided facing the second face and contains a first inorganic oxide, a second layer which is provided facing the first layer, contains either silver or aluminum, and reflects the excitation light or a light obtained by wavelength conversion of the excitation light by the wavelength conversion layer, a third layer which is provided facing the second layer and contains a first metal other than silver or aluminum, a fourth layer which is provided facing the third layer and contains the first inorganic oxide or a second inorganic oxide that is different from the first inorganic oxide, and a fifth layer which is provided facing the fourth layer and contains a metal.

11 Claims, 7 Drawing Sheets

WAVELENGTH CONVERSION ELEMENT, LIGHT SOURCE DEVICE, AND PROJECTOR

BACKGROUND

1. Technical Field

The present invention relates to a wavelength conversion element, a light source device, and a projector.

2. Related Art

Recently, as a lighting device for a projector, there is a device utilizing fluorescence as an illumination light. For example, JP-A-2015-119046 (Patent Document 1) discloses a light emitting device including a light source which emits a laser beam and a fluorescence emitting section which emits fluorescence by incidence of the laser beam. In this light emitting device, the fluorescence emitting section includes a phosphor layer, a substrate which supports the phosphor layer, and a reflection layer which is provided between the substrate and the phosphor layer. In the fluorescence emitting section, in order to prevent the deterioration of the reflection layer, a protective film is provided on the substrate side of the reflection layer. The protective film is constituted by a metal or an inorganic oxide.

As the reflection layer as described above, it is desired to use a metal material having a high reflectance. For example, WO 2015/194455 (Patent Document 2) discloses that a reflection layer is configured by using an Ag film having a high reflectance.

Therefore, it is also considered that an Ag film is used as a reflection layer which reflects fluorescence generated by a phosphor layer, and the above-mentioned protective film is provided on the Ag film.

For example, in the case where a metal is used as the protective film, ions or oxygen diffused from the side of a bonding material which bonds the phosphor layer to the substrate cannot be completely trapped, and the deterioration of the reflection layer cannot be sufficiently prevented.

For example, in the case where an inorganic oxide is used as the protective film, the adhesion between the reflection layer and the protective film is weak, and peeling may occur. Further, in the case where the phosphor layer is bonded to the substrate using a bonding material, due to the stress by the bonding material, the protective film is destroyed, and the reflection layer may be deteriorated.

When the reflection film is deteriorated in this manner, the reflectance is decreased, and therefore, a problem that the fluorescence extraction efficiency is decreased occurs.

SUMMARY

An advantage of some aspects of the invention is to provide a wavelength conversion element capable of suppressing the decrease in fluorescence extraction efficiency by suppressing the deterioration of a reflection layer. Another advantage of some aspects of the invention is to provide a light source device including the wavelength conversion element. Still another advantage of some aspects of the invention is to provide a projector including the light source device.

According to a first aspect of the invention, a wavelength conversion element is provided. The wavelength conversion element includes a wavelength conversion layer which has a first face on which an excitation light is incident and a second face facing the first face, a first layer which is provided facing the second face and contains a first inorganic oxide, a second layer which is provided facing the first layer, contains either silver or aluminum, and reflects the excitation light or a light obtained by wavelength conversion of the excitation light by the wavelength conversion layer, a third layer which is provided facing the second layer and contains a first metal other than silver or aluminum, a fourth layer which is provided facing the third layer and contains the first inorganic oxide or a second inorganic oxide that is different from the first inorganic oxide, and a fifth layer which is provided facing the fourth layer and contains the first metal or a second metal that is different from the first metal is provided.

In the wavelength conversion element according to the first aspect of the invention, the adhesion between the second layer and the fourth layer can be ensured by the third layer. For example, in the case where the wavelength conversion element is bonded to a substrate, the fourth layer captures the diffusion of ions or oxygen generated from the bonding material, and therefore, the deterioration of the second layer can be suppressed. Further, the fifth layer relieves a pressure generated during bonding, thereby preventing the destruction of the fourth layer. Therefore, the reliability of the fourth layer is improved, and thus, the deterioration of the second layer due to diffusion of ions or oxygen can be suppressed.

Due to this, a decrease in reflectance accompanying the deterioration of the second layer hardly occurs, and thus, a light generated by the wavelength conversion layer can be favorably reflected and emitted. Accordingly, a wavelength conversion element in which a decrease in the extraction efficiency of a wavelength-converted light is suppressed is provided.

In the first aspect of the invention, it is preferred that the wavelength conversion element includes a substrate, and the fifth layer and the substrate are bonded to each other by a bonding material provided between the fifth layer and the substrate.

According to this configuration, by bonding the fifth layer to the substrate, heat of the wavelength conversion layer can be efficiently discharged to the substrate. Therefore, the heat dissipation of the wavelength conversion layer is improved.

Further, the fourth layer captures the diffusion of ions or oxygen generated from the bonding material which bonds the wavelength conversion element to the substrate, and therefore, the deterioration of the second layer can be suppressed. Further, the fifth layer relieves a pressure generated when bonding the wavelength conversion element to the substrate, thereby preventing the destruction of the fourth layer. Therefore, the reliability of the fourth layer is improved, and thus, the deterioration of the second layer due to diffusion of ions or oxygen can be suppressed.

Due to this, a decrease in reflectance accompanying the deterioration of the second layer hardly occurs, and thus, a light generated by the wavelength conversion layer can be favorably reflected and emitted. Accordingly, a wavelength conversion element in which a decrease in the extraction efficiency of a wavelength-converted light is suppressed is provided.

In the first aspect of the invention, it is preferred that the third layer includes a second layer-side metal layer which is provided on the second layer side, and a fourth layer-side metal layer which is provided on the fourth layer side and contains a material that is different from that of the second layer-side metal layer.

According to this configuration, by forming a portion coming into contact with the second layer and a portion coming into contact with the fourth layer of different materials, the deterioration of the second layer can be more effectively prevented.

In the first aspect of the invention, it is preferred that at least one of the third layer and the fifth layer contains any one material of Al, Cr, and Ti.

According to this configuration, any one material of Al, Cr, and Ti is contained, and therefore, at least one of the third layer and the fifth layer forms a passive film. Therefore, the third layer or the fifth layer has excellent corrosion performance, and thus, the deterioration of the second layer can be more effectively prevented.

In the first aspect of the invention, it is preferred that the wavelength conversion element has a sixth layer which is provided between the fifth layer and the bonding material.

According to this configuration, for example, by using a material having favorable affinity for the bonding material as the sixth layer, the reliability for bonding of the bonding material can be improved.

According to a second aspect of the invention, a light source device is provided. The light source device includes the wavelength conversion element according to the first aspect of the invention, and a light source which emits a light toward the wavelength conversion element.

In the light source device according to the second aspect of the invention, by using the wavelength conversion element in which a decrease in the extraction efficiency of a wavelength-converted light is suppressed, the loss of the wavelength-converted light can be reduced.

According to a third aspect of the invention, a projector is provided. The projector includes the light source device according to the second aspect of the invention, a light modulator which modulates a light from the light source device in accordance with image information to form an image light, and a projection optical system which projects the image light.

The projector according to the third aspect of the invention includes the light source device according to the second aspect of the invention in which the loss of a wavelength-converted light is reduced, and therefore can form a high-luminance image.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
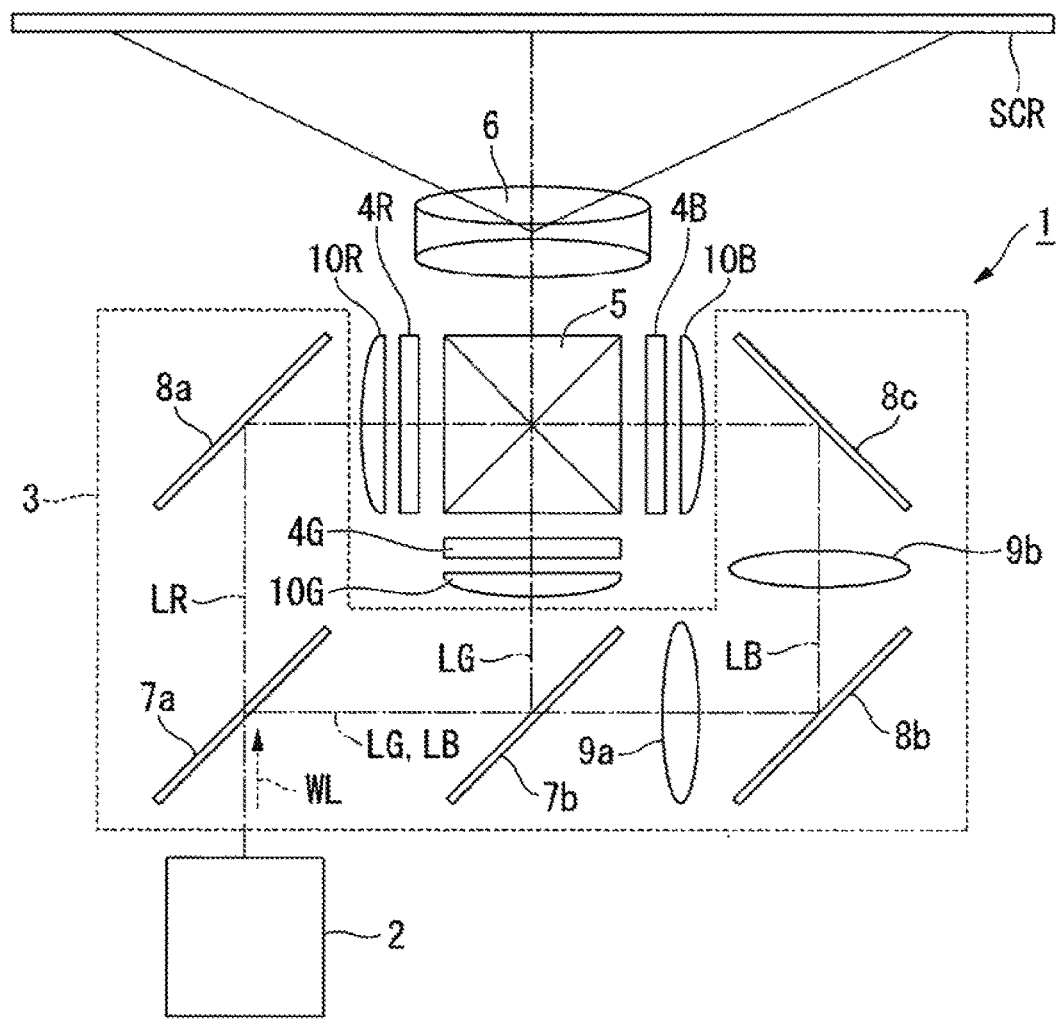
FIG. 1 is a view showing a schematic configuration of a projector according to a first embodiment.

Hereinafter, embodiments of the invention will be described in detail with reference to the drawings.

In the drawings to be used in the following description, in order to facilitate the understanding of features, characteristic portions are sometimes illustrated at an enlarged scale for convenience, and the dimensional ratios and the like of the respective components are not necessarily the same as the actual ones.

First Embodiment

First, one example of a projector according to this embodiment will be described.

FIG. 1 is a view showing a schematic configuration of the projector according to this embodiment.

As shown in FIG. 1, a projector 1 of this embodiment is a projection-type image display device which displays a color video image on a screen SCR. The projector 1 includes a lighting device 2, a color separation optical system 3, a light modulator 4R, a light modulator 4G, a light modulator 4B, a combining optical system 5, and a projection optical system 6.

The color separation optical system 3 separates an illumination light WL into a red light LR, a green light LG, and a blue light LB. The color separation optical system 3 generally includes a first dichroic mirror 7a, a second dichroic mirror 7b, a first total reflection mirror 8a, a second total reflection mirror 8b, a third total reflection mirror 8c, a first relay lens 9a, and a second relay lens 9b.

The first dichroic mirror 7a separates the illumination light WL from the lighting device 2 into the red light LR and the other lights (the green light LG and the blue light LB). The first dichroic mirror 7a transmits the separated red light LR and reflects the others lights (the green light LG and the blue light LB). On the other hand, the second dichroic mirror 7b reflects the green light LG and also transmits the blue light LB, thereby separating the other lights into the green light LG and the blue light LB.

The first total reflection mirror 8a is disposed in the optical path of the red light LR and reflects the red light LR transmitted through the first dichroic mirror 7a toward the light modulator 4R. On the other hand, the second total reflection mirror 8b and the third total reflection mirror 8c are disposed in the optical path of the blue light LB and guide the blue light LB transmitted through the second dichroic mirror 7b to the light modulator 4B. The green light LG is reflected from the second dichroic mirror 7b toward the light modulator 4G.

The first relay lens 9a and the second relay lens 9b are disposed downstream of the second dichroic mirror 7b in the optical path of the blue light LB.

The light modulator 4R modulates the red light LR in accordance with image information to form an image light corresponding to the red light LR. The light modulator 4G modulates the green light LG in accordance with image information to form an image light corresponding to the green light LG. The light modulator 4B modulates the blue light LB in accordance with image information to form an image light corresponding to the blue light LB.

In each of the light modulator 4R, the light modulator 4G, and the light modulator 4B, for example, a transmission-type liquid crystal panel is used. Further, a polarizing plate (not shown) is disposed on each of the light incident side and the light emission side of the liquid crystal panel.

Further, a field lens 10R, a field lens 10G, and a field lens 10B axe disposed on the light incident side of the light modulator 4R, the light modulator 4G, and the light modulator 4B, respectively. The field lens 10R, the field lens 10G, and the field lens 10B collimate the red light LR, the green light LG, and the blue light LB to be incident on the light modulator 4R, the light modulator 4G, and the light modulator 4B, respectively.

An image light from each of the light modulator 4R, the light modulator 4G, and the light modulator 4B is incident on the combining optical system 5. The combining optical system 5 combines the image lights corresponding to the red light LR, the green light LG, and the blue light LB, respectively, and emits the combined image light toward the projection optical system 6. In the combining optical system 5, for example, a cross dichroic prism is used.

The projection optical system 6 is composed of a group of projection lenses and enlarges the image light combined by the combining optical system 5 and projects the enlarged image light toward the screen SCR. In this manner, an enlarged color video image is displayed on the screen SCR.

Lighting Device

Figure 2:
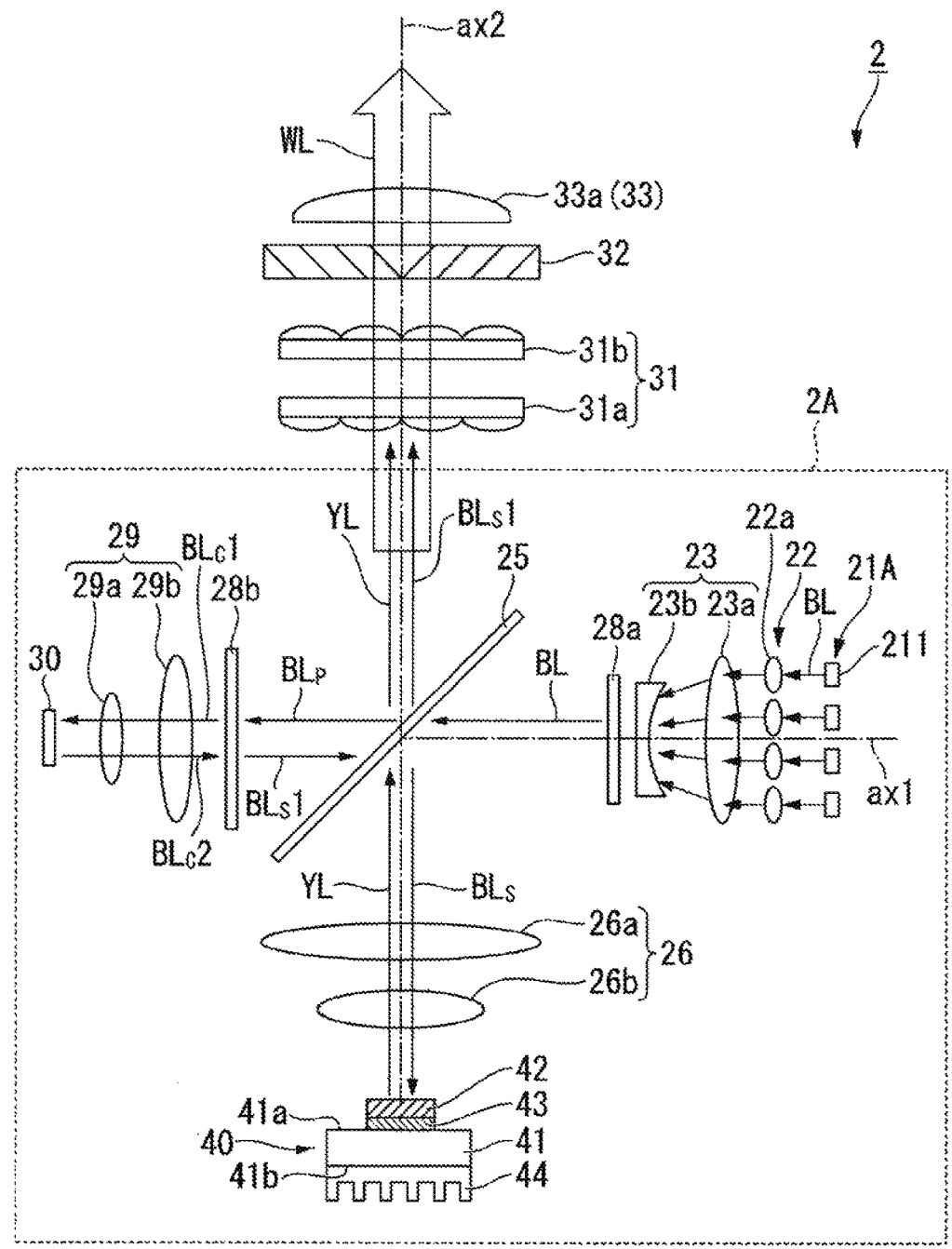
FIG. 2 is a view showing a schematic configuration of a lighting device.

Next, the lighting device 2 according to one embodiment of the invention will be described. FIG. 2 is a view showing a schematic configuration of the lighting device 2. As shown in FIG. 2, the lighting device 2 includes a light source device 2A, an integrator optical system 31, a polarization conversion element 32, and a superimposing lens 33a. In this embodiment, the integrator optical system 31 and the superimposing lens 33a constitute a superimposing optical system 33.

The light source device 2A includes an array light source 21A, a collimator optical system 22, an afocal optical system 23, a first retardation plate 28a, a polarization separation element 25, a first light condensing optical system 26, a wavelength conversion element 40, a second retardation plate 28b, a second light condensing optical system 29, and a diffuse reflection element 30.

The array light source 21A, the collimator optical system 22, the afocal optical system 23, the first retardation plate 28a, the polarization separation element 25, the second retardation plate 28b, the second light condensing optical system 29, and the diffuse reflection element 30 are sequentially arranged side by side on an optical axis ax1. On the other hand, the wavelength conversion element 40, the first light condensing optical system 26, the polarization separation element 25, the integrator optical system 31, the polarization conversion element 32, and the superimposing lens 33a are sequentially arranged side by side on an illumination light axis ax2. The optical axis ax1 and the illumination light axis ax2 are present on the same plane and orthogonal to each other.

The array light source 21A includes a plurality of semiconductor lasers 211 as a solid light source. The plurality of semiconductor lasers 211 are arranged in an array on a plane orthogonal to the optical axis ax1.

Each of the semiconductor lasers 211 emits, for example, a blue light, beam BL (for example, a laser beam having a peak wavelength of 460 nm). The array light source 21A emits a light beam bundle composed of a plurality of light beams BL. In this embodiment, the array light source 21A corresponds to the "light source" described in the appended claims.

The light beam BL emitted from the array light source 21A is incident on the collimator optical system 22. The collimator optical system 22 converts the light beam BL emitted from the array light source 21A into a parallel light. The collimator optical system 22 is constituted by, for example, a plurality of collimator lenses 22a arranged side by side in an array. The plurality of collimator lenses 22a are disposed corresponding to the plurality of semiconductor lasers 211.

The light beam BL having passed through the collimator optical system 22 is incident on the afocal optical system 23. The afocal optical system 23 adjusts the luminous flux diameter of the light beam BL. The afocal optical system 23 is constituted by, for example, a convex lens 23a and a concave lens 23b.

The light beam BL having passed through the afocal optical system 23 is incident on the first retardation plate 28a. The first retardation plate 28a is, for example, a rotatable ½-wave plate. The light beam BL emitted from the semiconductor laser 211 is a linearly polarized light. By appropriately setting the rotation angle of the first retardation plate 28a, the light beam BL to be transmitted through the first retardation plate 28a can be converted into a light beam containing an S-polarized component and a P-polarized component with respect to the polarization separation element 25 at a predetermined ratio. By rotating the first retardation plate 28a, the ratio of the S-polarized component to the P-polarized component can be changed.

The light beam BL containing the S-polarized component and the P-polarized component generated by passing through the first retardation plate 28a is incident on the polarization separation element 25. The polarization separation element 25 is constituted by, for example, a polarization beam splitter having wavelength selectivity. The polarization separation element 25 forms an angle of 45° with respect to the optical axis ax1 and also the illumination light axis ax2.

The polarization separation element 25 has a polarization separation function of separating the light beam BL into a light beam BLs which is the S-polarized component and a light beam BLp which is the P-polarized component with respect to the polarization separation element 25. Specifically, the polarization separation element 25 reflects the light beam BLs which is the S-polarized component and transmits the light beam BLp which is the P-polarized component.

The polarization separation element 25 also has a color separation function of transmitting fluorescence YL having a wavelength band different from that of the light beam BL irrespective of the polarization state of the fluorescence YL.

The S-polarized light beam BLs emitted from the polarization separation element 25 is incident on the first light condensing optical system 26. The first light condensing optical system 26 condenses the light beam BLs toward the wavelength conversion element 40.

In this embodiment, the first light condensing optical system 26 is constituted by, for example, a first lens 26a and a second lens 26b. The light beam BLs emitted from the first light condensing optical system 26 is incident on the wavelength conversion element 40 in a condensed state.

The fluorescence YL generated by the wavelength conversion element 40 is collimated by the first light condensing optical system 26 and then incident on the polarization separation element 25. The fluorescence YL is transmitted through the polarization separation element 25.

On the other hand, the P-polarized light beam BLp emitted from the polarization separation element 25 is incident on the second retardation plate 28b. The second retardation plate 28b is constituted by a ¼-wave plate disposed in the optical path between the polarization separation element 25 and the diffuse reflection element 30. Therefore, the P-polarized light beam BLp emitted from the polarization separation element 25 is converted into, for example, a right-hand circularly polarized blue light BLc1 by the second retardation plate 28b, and thereafter incident on the second light condensing optical system 29.

The second light condensing optical system 29 is constituted by, for example, convex lenses 29a and 29b, and makes the blue light BLc1 incident on the diffuse reflection element 30 in a condensed state.

The diffuse reflection element 30 is disposed on the opposite side to the phosphor layer 42 with respect to the polarization separation element 25, and diffusely reflects the blue light BLc1 emitted from the second light condensing optical system 29 toward the polarization separation element 25. As the diffuse reflection element 30, it is preferred to use an element which causes Lambertian reflection of the blue light BLc1 and does not disturb the polarization state.

Hereinafter, the light diffusely reflected by the diffuse reflection element 30 is referred to as "blue light BLc2". According to this embodiment, by diffusely reflecting the blue light BLc1, the blue light BLc2 having a substantially uniform illuminance distribution is obtained. For example, the right-hand circularly polarized blue light BLc1 is reflected as the left-hand circularly polarized blue light BLc2.

The blue light BLc2 is converted into a parallel light by the second light condensing optical system 29 and thereafter incident on the second retardation plate 28b again.

The left-hand circularly polarized blue light BLc2 is converted into an S-polarized blue light BLs1 by the second retardation plate 28b. The S-polarized blue light BLs1 is reflected toward the integrator optical system 31 by the polarization separation element 25.

Accordingly, the blue light BLs1 is used as the illumination light WL along with the fluorescence YL transmitted through the polarization separation element 25. That is, the blue light BLs1 and the fluorescence YL are emitted in the same direction from the polarization separation element 25, and a white illumination light WL, in which the blue light BLs1 and the fluorescence (yellow light) YL are mixed, is generated.

The illumination light WL is emitted toward the integrator optical system 31. The integrator optical system 31 is constituted by, for example, a lens array 31a and a lens array 31b. Each of the lens arrays 31a and 31b is composed of a plurality of small lenses arranged in an array.

The illumination light WL transmitted through the integrator optical system 31 is incident on the polarization conversion element 32. The polarization conversion element 32 is constituted by a polarization separation film and a retardation plate. The polarization conversion element 32 converts the illumination light WL which includes non-polarized fluorescence YL into a linearly polarized light.

The illumination light WL transmitted through the polarization conversion element 32 is incident on the superimposing lens 33a. The superimposing lens 33a homogenizes the distribution of illuminance by the illumination light WL in an illuminated region in cooperation with the integrator optical system 31. In this manner, the lighting device 2 generates the illumination light WL.

Wavelength Conversion Element

As shown in FIG. 2, the wavelength conversion element 40 includes a substrate 41 and the phosphor layer 42 and has a fixed-type configuration so as not to rotate. The substrate 41 has an upper face 41a on the first light condensing optical system 26 side and a lower face 41b on the opposite side to the upper face 41a. The wavelength conversion element 40 further includes a reflection member 43 provided between the upper face 41a and the phosphor layer 42 and a heat radiation member 44 provided on the lower face 41b. In this embodiment, the phosphor layer 42 corresponds to the "wavelength conversion layer" described in the appended claims.

As the material of the substrate 41, it is preferred to use a material having high thermal conductivity and excellent heat dissipation, and examples thereof include metals such as aluminum, and copper, and ceramics such as aluminum nitride, alumina, sapphire, and diamond. In this embodiment, the substrate 41 was formed using copper.

In this embodiment, the phosphor layer 42 is held through the below-mentioned bonding material on the upper face 41a of the substrate 41. The phosphor layer 42 partially converts an incident light into fluorescence YL and emits the fluorescence YL. Further, the reflection member 43 reflects a light incident from the phosphor layer 42 toward the first light condensing optical system 26.

The heat radiation member 44 is constituted by, for example, a heat sink and is configured to include a plurality of fins. The heat radiation member 44 is provided on the lower face 41b on the opposite side to the phosphor layer 42 of the substrate 41. The heat radiation member 44 is fixed to the substrate 41 by bonding (metal bonding) with, for example, a brazing metal. In the wavelength conversion element 40, heat can be radiated through this heat radiation member 44, and therefore, thermal deterioration of the phosphor layer 42 can be prevented, and also a decrease in the conversion efficiency due to an increase in the temperature of the phosphor layer 42 can be suppressed.

Figure 3:
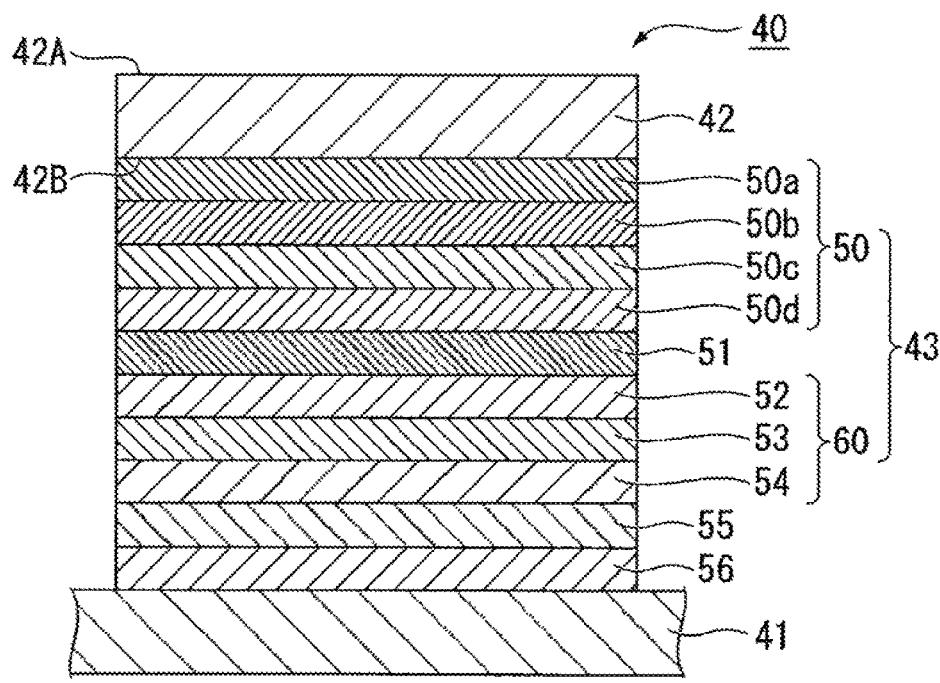
FIG. 3 is a cross-sectional view showing a configuration of a main portion of a wavelength conversion element.

In this embodiment, the reflection member 43 is constituted by a multilayer film in which a plurality of films are stacked. FIG. 3 is a cross-sectional view showing a configuration of a main portion of the wavelength conversion element 40. Specifically, FIG. 3 is a view showing the cross section of the reflection member 43. In FIG. 3, an illustration of the heat radiation member 44 is omitted. Hereinafter, the light beam BLs which is emitted from the first light condensing optical system 26 and is incident on the phosphor layer 42 is referred to as "excitation light BLs".

As shown in FIG. 3, the phosphor layer 42 includes a light incident face 42A on which the excitation light BLs is incident and also from which the fluorescence YL is emitted, and a face which faces the light incident face 42A, that is, a bottom face 42B on which the reflection member 43 is provided. In this embodiment, the phosphor layer 42 corresponds to the "wavelength conversion layer" described in the appended claims, the light incident face 42A corresponds to the "first face" described in the appended claims, and the bottom face 42B corresponds to the "second face" described in the appended claims.

In this embodiment, the phosphor layer 42 is a ceramic phosphor formed by firing phosphor particles. As the phosphor particles constituting the phosphor layer 42, a YAG (Yttrium Aluminum Garnet) phosphor containing Ce ions is used. Such a ceramic phosphor has excellent heat resistance, and therefore, the incident light amount of the excitation light can be increased, and thus, the generation amount of fluorescence can be increased.

As the forming material of the phosphor particles, one type of material may be used, or a material obtained by mixing particles formed using two or more types of materials may be used. As the phosphor layer 42, a phosphor layer in which the phosphor particles are dispersed in an inorganic binder such as alumina, a phosphor layer formed by firing a glass binder which is an inorganic material and the phosphor particles, or the like is preferably used.

The reflection member 43 is provided on the bottom face 42B side of the phosphor layer 42. The phosphor layer 42 on which the reflection member 43 is formed is bonded to the substrate 41 through a bonding material 56.

The reflection member 43 of this embodiment is constituted by stacking a multilayer film 50, a reflection layer 51, a protective layer 60, and a bonding assisting layer 55 in this order from the bottom face 42B side of the phosphor layer 42.

The multilayer film 50 is a layer containing an inorganic oxide and includes a total reflection layer 50a which totally reflects a light at an angle not smaller than the critical angle of the fluorescence YL generated by the phosphor layer 42, and reflection enhancing layers 50b, 50c, and 50d. The reflection enhancing layers 50b, 50c, and 50d are provided for exhibiting a reflection enhancing effect and improve the extraction efficiency of the fluorescence YL. The multilayer film 50 corresponds to the "first layer" described in the appended claims.

In this embodiment, as the total reflection layer 50a, for example, $SiO_2$ was used. By using $SiO_2$, the fluorescence YL can be favorably totally reflected.

Further, as the reflection enhancing layer 50b, $TiO_2$ was used, as the reflection enhancing layer 50c, $SiO_2$ was used, and as the reflection enhancing layer 50d, $Al_2O_3$ was used.

Accordingly, the multilayer film 50 is composed of an inorganic oxide.

In this embodiment, the reflection layer 51 is provided facing the multilayer film 50. The reflection layer 51 is provided abutting or being stacked on the multilayer film 50. The reflection layer 51 is provided abutting or being stacked on the reflection enhancing layer 50d of the multilayer film 50. The multilayer film 50 is provided abutting or being stacked between the phosphor layer 42 and the reflection layer 51.

The reflection layer 51 partially reflects the fluorescence YL, which is generated by the phosphor layer 42 and is directed to the bottom face 42B side, toward the light incident face 42A side. Further, the reflection layer 51 reflects the excitation light BLs which is incident on the phosphor layer 42 and is then incident on the reflection member 43 without being converted into the fluorescence YL and returns the excitation light BLs inside the phosphor layer 42. By doing this, the fluorescence YL can be efficiently generated. The reflection layer 51 corresponds to the "second layer" described in the appended claims.

As the material of the reflection layer 51, Ag (silver) or Al (aluminum) was used. In this embodiment, Ag having a higher reflectance was used as the material of the reflection layer 51.

The protective layer 60 is provided for suppressing the deterioration of the reflection layer 51 by protecting the reflection layer 51. In this embodiment, the protective layer 60 includes a first metal layer 52, an inorganic oxide layer 53, and a second metal layer 54.

The first metal layer 52 is provided facing the reflection layer 51. The first metal layer 52 is provided abutting or being stacked on the reflection layer 51. The reflection layer 51 is provided abutting or being stacked between the multilayer film 50 (reflection enhancing layer 50d) and the first metal layer 52. The first metal layer 52 is provided in a state of being in close contact with the reflection layer 51. According to this, peeling hardly occurs between the reflection layer 51 and the protective layer 60.

As the material of the first metal layer 52, for example, any one of Ni, Cr, Co, Mo, Cu, Zn, Al, Ti, and Fe is used. The first metal layer 52 corresponds to the "third layer" described in the appended claims.

Here, Ag constituting the reflection layer 51 has a face-centered cubic crystal structure. Therefore, as the material of the first metal layer 52, it is desired to use a material having the same crystal structure as that of Ag. Among the above-mentioned metal materials, Ni and Cu have the same crystal structure as that of Ag. In this embodiment, as the material of the first metal layer 52, for example, Ni was used. By using a material having the same crystal structure as the first metal layer 52, the layer hardly disrupts the crystallinity of the Ag film, and therefore, the reflectance of the reflection layer 51 can be increased.

The inorganic oxide layer 53 is provided facing the first metal layer 52. The inorganic oxide layer 53 is provided abutting or being stacked on the first metal layer 52. The first metal layer 52 is provided abutting or being stacked between the reflection layer 51 and the inorganic oxide layer 53. The inorganic oxide layer 53 has a function of preventing the diffusion of ions or oxygen to the phosphor layer 42 side. As the material of the inorganic oxide layer 53, for example, any of $Al_2O_3$, $SiO_2$, and $TiO_2$ can be used.

In this embodiment, as the inorganic oxide layer 53, $Al_2O_3$ was used. $Al_2O_3$ has a dense crystal structure, and therefore has an excellent function of trapping ions or oxygen generated from the bonding material 56. The inorganic oxide layer 53 corresponds to the "fourth layer" described in the appended claims.

The second metal layer 54 is provided facing the inorganic oxide layer 53. The second metal layer 54 is provided abutting or being stacked on the inorganic oxide layer 53. The inorganic oxide layer 53 is provided abutting or being stacked between the first metal layer 52 and the second metal layer 54. The second metal layer 54 has a function of relieving stress generated by the bonding material 56 as described later. As the material of the second metal layer 54, for example, any one of Cr, Ni, Co, Mo, Cu, Zn, Al, Ti, and Fe is used. The second metal layer 54 corresponds to the "fifth layer" described in the appended claims.

As the material of the second metal layer 54, a metal which forms a passive film was used. Among the above-mentioned metal materials, for example, Al, Cr, and Ti form a passive film. In this embodiment, as the material of the second metal layer 54, for example, Cr was used. The film thickness of Cr was set to, for example, about 100 nm. By using a metal material which forms a passive film as the second metal layer 54 in this manner, the protection performance for the reflection layer 51 can be improved.

The bonding assisting layer 55 improves the reliability for bonding of the reflection member 43 to the substrate 41 by the bonding material 56. As the bonding assisting layer 55, a metal material having high affinity for the bonding material 56 is used. That is, the material of the bonding assisting layer 55 is selected according to the bonding material 56. The bonding assisting layer 55 corresponds to the "sixth layer" described in the appended claims.

For example, in the case where a sintered-type bonding material using nano-Ag particles is used as the material of the bonding material 56, Ag is used as the material of the bonding assisting layer 55.

In the case where a sintered-type bonding material using nano-Cu particles is used as the material of the bonding material 56, Cu is used as the material of the bonding assisting layer 55.

In the case where a sintered-type bonding material using nano-Au particles is used as the material of the bonding material 56, Au is used as the material of the bonding assisting layer 55.

In the case where an AuSn-based solder or a SnAgCu-based solder is used as the material of the bonding material 56, a Ni/Pt/Au plating layer or a Ni/Ru plating layer is used as the bonding assisting layer 55.

By using the combinations described above as the bonding material 56 and the bonding assisting layer 55, the reflection member 43 and the substrate 41 can be favorably bonded.

In this embodiment, for example, a sintered-type bonding material using nano-Ag particles was used as the material of the bonding material 56. The sintered-type bonding material has high thermal conductivity, and therefore, the thermal conductivity between the reflection member 43 and the substrate 41 is improved. Due to this, heat of the phosphor layer 42 is efficiently discharged to the substrate 41 side, and therefore, an increase in the temperature of the phosphor layer 42 is suppressed, and thus, a decrease in the fluorescence conversion efficiency of the phosphor layer 42 can be prevented.

Figure 4:
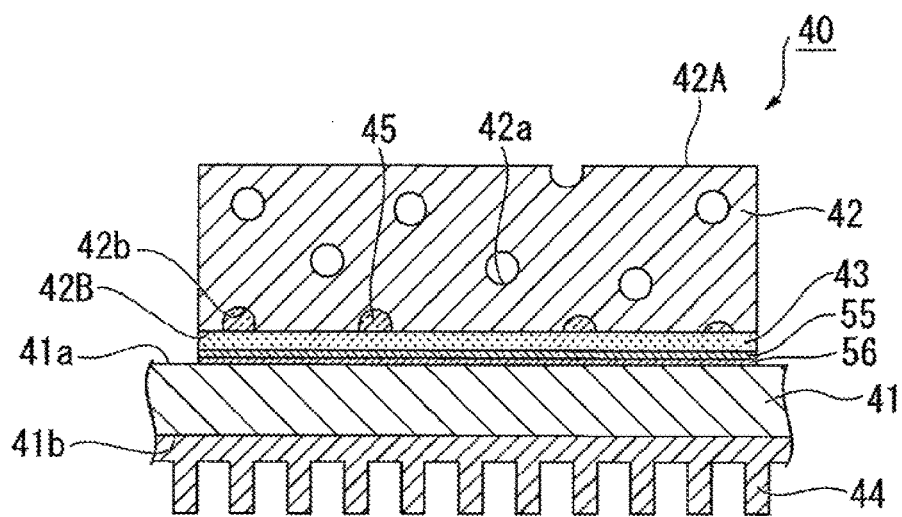
FIG. 4 is a cross-sectional view showing a configuration of a main portion of a phosphor layer.

FIG. 4 is a cross-sectional view showing a configuration of a main portion of the phosphor layer 42.

As shown in FIG. 4, in this embodiment, the phosphor layer 42 has a plurality of pores 42a which are provided inside. According to this, the phosphor layer 42 has a light scattering property due to the plurality of pores 42a.

Some of the plurality of pores 42a are formed on the surface (bottom face 42B) of the phosphor layer 42, and therefore, a recessed portion 42b due to the pore 42a occurs on the bottom face 42B of the phosphor layer 42. The wavelength conversion element 40 of this embodiment has a transparent member 45 which seals the recessed portion 42b.

As the material of the transparent member 45, an inorganic material having a light transmission property, for example, aluminia, $Y_3Al_5O_{12}$, $YAlO_3$, zirconia dioxide, $Lu_3Al_5O_{12}$, $SiO_2$ (a glass paste), or an anaerobic adhesive is used. In this embodiment, as the material of the transparent member 45, it is desired to use the same material as that of the reflection member 43 formed on the bottom face 42B of the phosphor layer 42.

Specifically, as the material of the transparent member 45, for example, $SiO_2$ which is the same material as that of the total reflection layer 50a can be used. According to this, the transparent member 45 and the total reflection layer 50a (part of the first layer of the reflection member 43) can be formed by the same process.

As described above, the reflection member 43 is constituted by forming a plurality of layers on the bottom face 42B of the phosphor layer 42. Here, if the flatness of the bottom face 42B is low, it becomes difficult to favorably form the respective layers constituting the reflection member 43. If the reflection member 43 cannot be favorably formed on the bottom face 42B, the fluorescence YL cannot be reflected toward the light incident face 42A, and the extraction efficiency of the fluorescence YL is decreased.

On the other hand, in the wavelength conversion element 40 of this embodiment, by sealing the recessed portion 42b with the transparent member 45, the bottom face 42B is made a substantially flat face. Here, the "substantially flat face" means a flatness such that the reflection member 43 can be favorably formed on the bottom face 42B by vapor deposition or the like and a ruggedness to such a degree that the reflection member 43 can be formed is acceptable.

In this embodiment, the transparent member 45 is constituted by the same material as that of the total reflection layer 50a. Therefore, the transparent member 45 and the total reflection layer 50a (reflection member 43) are integrally formed.

The wavelength conversion element 40 of this embodiment is produced by, for example, the following production method.

First, a mixture composed of phosphor particles constituting the phosphor layer 42 and an organic substance is prepared, and the resulting mixture is fired at a predetermined temperature.

By firing, the organic substance is evaporated, and as shown in FIG. 4, the phosphor layer 42 having a plurality of pores 42a and composed of a phosphor is formed. The size or number of pores 42a can be adjusted by the firing temperature, the material of the organic substance, or the like.

Subsequently, both faces of the phosphor layer 42 are ground and polished, whereby the phosphor layer 42 having the light incident face 42A and the bottom face 42B is formed. By grinding and polishing, some pores 42a are exposed outside, and the recessed portions 42b are formed on the bottom face 42B of the phosphor layer 42.

Subsequently, to the bottom face 42B, a glass paste ($SiO_2$) is applied by a spin coating method. By doing this, the glass paste is applied to the entire surface of the bottom face 42B in a state where the recessed portions 42b are filled up with the glass paste.

Then, by firing the glass paste, as shown in FIG. 4, the transparent member 45 which seals the recessed portions 42b, and the total reflection layer 50a formed integrally with the transparent member 45 are formed on the bottom face 42B. The method for applying the glass paste on the bottom face 42B is not limited to the spin coating method, and a doctor blade method may be used.

By sealing the recessed portions 42b with the transparent member 45 in this manner, the surface of the bottom face 42B (total reflection layer 50a) can be made a substantially flat face. The temperature when the glass paste is fired is lower than the temperature when the mixture composed of the phosphor particles and the organic substance is fired.

Subsequently, the respective layers are sequentially formed on the total reflection layer 50a by vapor deposition, sputtering, or the like, whereby the reflection member 43 is formed. The total reflection layer 50a has a substantiality flat face as described above, and therefore, the reflection member 43 can be uniformly formed on the bottom face 42B.

Subsequently, the substrate 41 and the stacked body of the reflection member 43 and the phosphor layer 12 are fixed through the bonding material 56. Finally, the heat radiation member 44 is fixed to the face on the opposite side to the phospor layer 42 of the substrate 41, whereby the wavelength conversion element 40 is produced.

In the above-mentioned production method, a mixture composed of phosphor particles constituting the phosphor layer 42 and an inorganic substance is prepared, and the mixture may be fired at a predetermined temperature, or only the phosphor particles constituting the phosphor layer 42 may be fired at a predetermined temperature.

Meanwhile, the bonding material 56 is deformed due to shrinkage or the like during bonding. Therefore, stress is applied to the reflection member 43 coming into contact with the bonding material 56. With the use of the protective layer 60 of this embodiment, the stress is relieved by the second metal layer 54, and therefore, the destruction of the inorganic oxide layer 53 due to the stress can be prevented.

Further, the bonding material 56 diffuses ions or oxygen during bonding. Such ions or oxygen may oxidize and deteriorate the reflection layer 51. According to this embodiment, the destruction of the inorganic oxide layer 53 is prevented as described above, and therefore, by the inorganic oxide layer 53, the diffusion of ions or oxygen is stably prevented. Accordingly, the deterioration, that is, the decrease in reflectance and durability due to the diffusion of ions or oxygen in the reflection layer 51 is suppressed.

In this embodiment, the sintered-type bonding material (nano-Ag particles) is used as the bonding material 56. Such a sintered-type bonding material causes metal diffusion and aggregation with the bonding assisting layer 55 during bonding, however, the diffusion and aggregation are blocked by the inorganic oxide layer 53.

The protective layer 60 is provided in a state of being in close contact with the reflection layer 51 by the first metal layer 52. Due to this, peeling hardly occurs between the reflection layer 51 and the protective layer 60. Therefore, the reflection layer 51 is stably protected by the protective layer 60, and thus, the reflection member 43 has excellent durability and high reliability.

As described above, in the wavelength conversion element 40 of this embodiment, the protective layer 60 and the reflection layer 51 favorably come in close contact with each other by the first metal layer 52, and therefore, the reflection layer 51 can be stably protected. Further, the inorganic oxide layer 53 captures the diffusion of ions or oxygen generated from the bonding material 56 when bonding the phosphor layer 42 to the substrate 41, and therefore, the deterioration of the reflection layer 51 can be suppressed. Further, the second metal layer 54 relieves a pressure generated by the bonding material 56 during bonding, thereby preventing the destruction of the inorganic oxide layer 53. Therefore, the reliability of the inorganic oxide layer 53 is improved, and thus, the deterioration of the reflection layer 51 due to the diffusion of ions or oxygen can be suppressed.

Accordingly, in the wavelength conversion element 40 of this embodiment, a decrease in reflectance accompanying the deterioration of the reflection layer 51 hardly occurs, and thus, a component incident on the bottom face 42B side of the fluorescence YL generated by the phosphor layer 42 is favorably reflected and can be emitted from the light incident face 42A. Therefore, a wavelength conversion element 40, in which the decrease in the extraction efficiency of the fluorescence YL is suppressed, and which has excellent reliability, can be provided.

In this embodiment, by filling up the recessed portions 42b of the phosphor layer 42 with the transparent member 45, the reflection member 43 is uniformly formed over the entire area of the bottom face 42B. Therefore, a component incident on the bottom face 42B side of the fluorescence YL generated by the phosphor layer 42 is favorably reflected by the reflection member 43 and emitted from the light incident face 42A. Therefore, the extraction efficiency of the fluorescence YL can be increased.

Further, the bottom face 42B becomes a substantially flat face, and therefore, the contact area between the phosphor layer 42 and the reflection member 43 can be increased. Due to this, heat generated in the phosphor layer 42 is efficiently transmitted to the reflection member 43. Further, heat generated in the phosphor layer 42 is transmitted to the substrate 41 and the heat radiation member 44 side through the reflection member 43. Therefore, the heat dissipation of the phosphor layer 42 is increased.

By increasing the heat dissipation of the phosphor layer 42 in this manner, the heat radiation member 44 can be miniaturized, and therefore, the wavelength conversion element 40 can be miniaturized.

In the wavelength conversion element 40 of this embodiment, by increasing the heat dissipation of the phosphor layer 42, an increase in the temperature of the phosphor layer 42 is reduced, and a decrease in the conversion efficiency of the phosphor layer 42 can be reduced.

Therefore, the light source device 2A including this wavelength conversion element 40 can provide a light source device in which the loss of the fluorescence YL is reduced.

Further, in the projector 1 of this embodiment, the lighting device 2 using the light source device 2A is included, and therefore, the projector 1 can form a high-luminance image.

Second Embodiment

Next, a wavelength conversion element according to a second embodiment of the invention will be described. The members common to those of the above-mentioned embodiment are denoted by the same reference numerals, and a detailed description thereof will be omitted.

Figure 5:
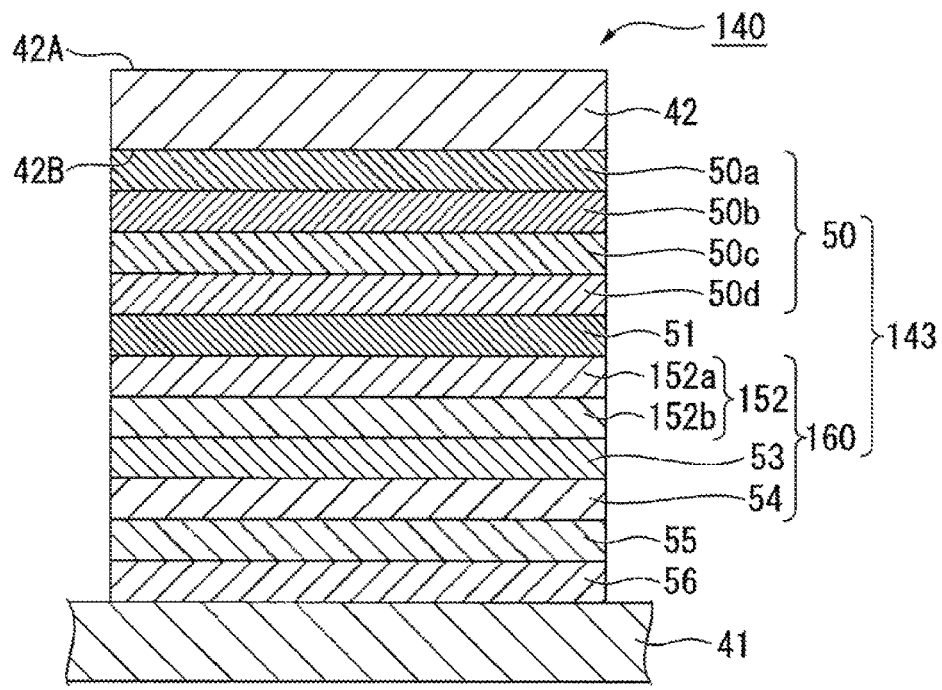
FIG. 5 is a cross-sectional view showing a configuration of a main portion of a wavelength conversion element of a second embodiment.

FIG. 5 is a cross-sectional view showing a configuration of a main portion of a wavelength conversion element 140 according to this embodiment. Specifically, FIG. 5 is a view showing the cross section of a reflection member 143.

As shown in FIG. 5, the wavelength conversion element 140 includes the reflection member 143 which is provided between an upper face 41a of a substrate 41 and a phosphor layer 42.

The reflection member 143 of this embodiment is constituted by stacking a multilayer film 50, a reflection layer 51, a protective layer 160, and a bonding assisting layer 55 in this order from the bottom face 42B side of the phosphor layer 42.

The protective layer 160 includes a first metal layer 152, an inorganic oxide layer 53, and a second metal layer 54.

In this embodiment, the first metal layer 152 includes a first metal layer 152a located on the reflection layer 51 side and a second metal layer 152b located on the inorganic oxide layer 53 side. That is, the first metal layer 152 has a two-layer structure. The first metal layer 152a is provided abutting or being stacked on the reflection layer 51. The second metal layer 152b is provided abutting or being stacked on the inorganic oxide layer 53. In this embodiment, the first metal layer 152a corresponds to the "second layer-side metal layer" described in the appended claims, and the second metal layer 152b corresponds to the "fourth layer-side metal layer" described in the appended claims.

As the materials of the first metal layer 152a and the second metal layer 152b, for example, any one of Ni, Cr, Co, Mo, Cu, Zn, Al, Ti, and Fe is used. In this embodiment, as the material of the first metal layer 152a located on the reflection layer 51 side, for example, Ni was used. Accordingly, the layer hardly disrupts the crystallinity of the Ag film, and therefore, the reflectance of the reflection layer 51 can be increased.

In this embodiment, as the material of the second metal layer 152*b* located on the inorganic oxide layer 53 side, a metal which forms a passive film was used. As the material of the second metal layer 152*b*, for example, Cr was used. Al or Ti which is another metal that forms a passive film may be used.

In the first metal layer 152 of this embodiment, a two-layer structure of the first metal layer 152*a* and the second metal layer 152*b* is adopted, and therefore, corrosion resistance attributed to the passive film is provided while increasing the reflectance of the reflection layer 51, and thus, the reliability of the protective layer 160 can be further improved.

In the wavelength conversion element 140 of this embodiment, the deterioration of the reflection layer 51 can be suppressed by the protective layer 160 having higher reliability. Therefore, a wavelength conversion element 140, in which a decrease in the extraction efficiency of the fluorescence YL is suppressed, and which has high reliability, is provided.

First Modification Example

Next, a wavelength conversion element according to a first modification example will be described. This modification example is a modification example of the first embodiment, and the members common to those of the first embodiment are denoted by the same reference numerals, and a detailed description thereof will be omitted.

Figure 6:
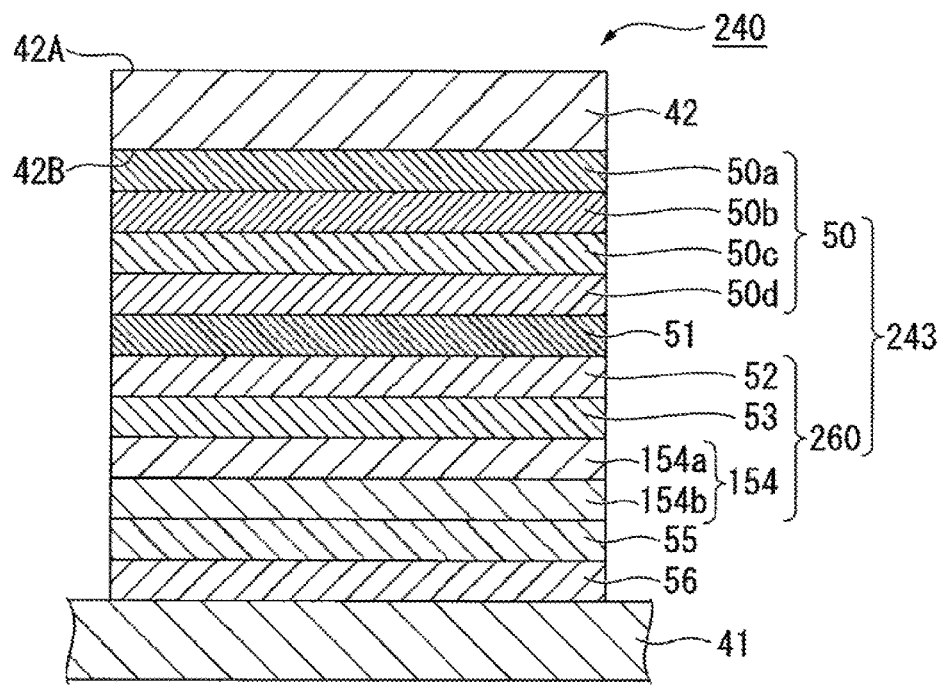
FIG. 6 is a cross-sectional view showing a configuration of a main portion of a wavelength conversion element of a first modification example.

FIG. 6 is a cross-sectional view showing a configuration of a main portion of a wavelength conversion element 240 of this modification example. Specifically, FIG. 6 is a view showing the cross section of a reflection member 243.

As shown in FIG. 6, the wavelength conversion element 240 includes the reflection member 243 which is provided between an upper face 41*a* of a substrate 41 and a phosphor layer 42.

The reflection member 243 of this modification example is constituted by stacking a multilayer film 50, a reflection layer 51, a protective layer 260, and a bonding assisting layer 55 in this order from the bottom face 42B side of the phosphor layer 42.

The protective layer 260 includes a first metal layer 52, an inorganic oxide layer 53, and a second metal layer 154.

In this modification example, the second metal layer 154 includes a first metal layer 154*a* located on the inorganic oxide layer 53 side and a second metal layer 154*b* located on the bonding assisting layer 55 side. That is, the second metal layer 154 has a two-layer structure. The first metal layer 154*a* is provided abutting or being stacked on the inorganic oxide layer 53. The second metal layer 154*b* is provided abutting or being stacked on the bonding assisting layer 55.

As the materials of the first metal layer 154*a* and the second metal layer 154*b*, for example, any one of Ni, Cr, Co, Mo, Cu, Zn, Al, Ti, and Fe is used. In this modification example, as the material of the first metal layer 154*a* located on the inorganic oxide layer 53 side, a metal which forms a passive film, for example, Cr was used. Al or Ti which is another metal that forms a passive film may be used. As the material of the second metal layer 154*b* located on the bonding assisting layer 55 side, for example, Ni was used.

The second metal layer 154 constituting the protective layer 260 may be constituted by stacking two or more metal layers. In this case, it is desired to use a metal which forms a passive film as the material of a metal layer coming into contact with the inorganic oxide layer 53.

Second Modification Example

Next, a wavelength conversion element according to a second modification example will be described.

This modification example is configured to combine the above-mentioned second embodiment with the configuration of the above-mentioned first modification example.

Figure 7:
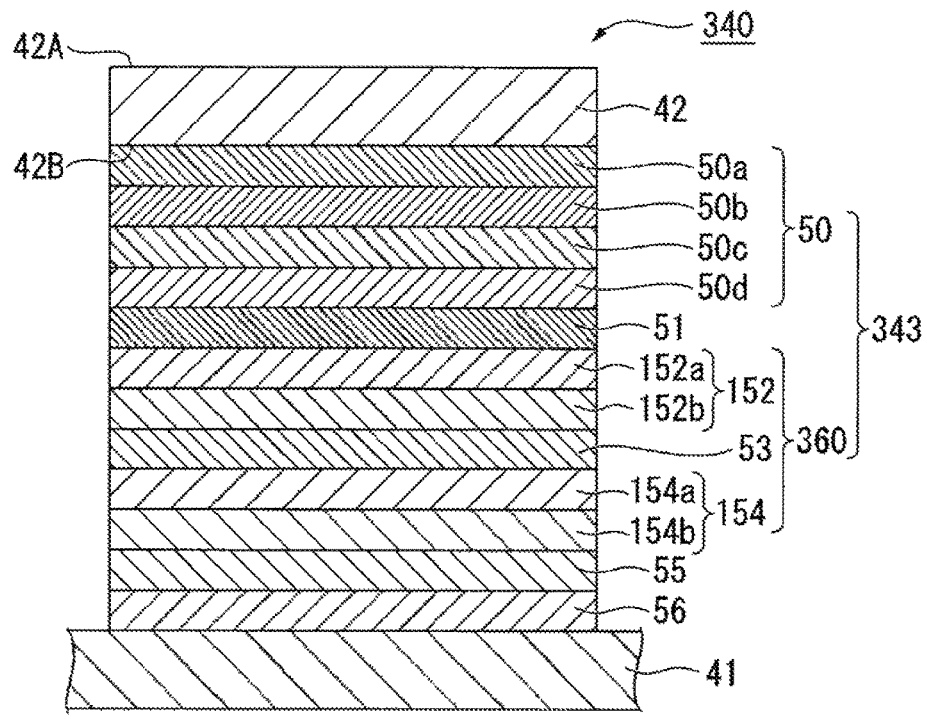
FIG. 7 is a cross-sectional view showing a configuration of a main portion of a wavelength conversion element of a second modification example.

FIG. 7 is a cross-sectional view showing a configuration of a main portion of a wavelength conversion element 340 of this modification example. Specifically, FIG. 7 is a view showing the cross section of a reflection member 343.

As shown in FIG. 7, the reflection member 343 of this modification example is constituted by stacking a multilayer film 50, a reflection layer 51, a protective layer 360, and a bonding assisting layer 55. In this modification example, the protective layer 360 includes a first metal layer 152, an inorganic oxide layer 53, and a second metal layer 154.

Also in the wavelength conversion element 340 of this modification example, the same effects as in the above-mentioned embodiments can be obtained.

Third Modification Example

Next, a wavelength conversion element according to a third modification example will be described. This modification example is a modification example of the first embodiment, and the members common to those of the first embodiment are denoted by the same reference numerals, and a detailed description thereof will be omitted.

Figure 8:
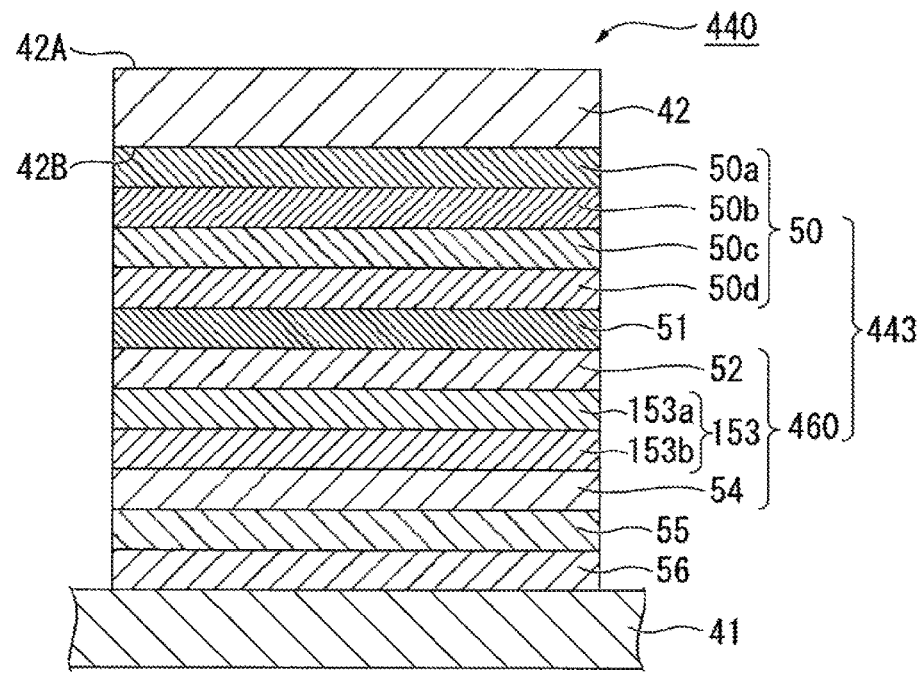
FIG. 8 is a cross-sectional view showing a configuration of a main portion of a wavelength conversion element of a third modification example.

FIG. 8 is a cross-sectional view showing a configuration of a main portion of a wavelength conversion element 440 of this modification example. Specifically, FIG. 8 is a view showing the cross section of a reflection member 443.

As shown in FIG. 8, the reflection member 443 of this modification example is constituted by stacking a multilayer film 50, a reflection layer 51, a protective layer 460, and a bonding assisting layer 55. In this modification example, the protective layer 460 includes a first metal layer 52, an inorganic oxide layer 153, and a second metal layer 54.

In this modification example, the inorganic oxide layer 153 has a two-layer structure of a first inorganic oxide layer 153*a* and a second inorganic oxide layer 153*b*. As the material of the first inorganic oxide layer 153*a*, for example, $SiO_2$ was used, and as the material of the second inorganic oxide layer 153*b*, for example, $Al_2O_3$ was used. The first inorganic oxide layer 153*a* is provided abutting or being stacked on the first metal layer 52. The second inorganic oxide layer 153*b* is provided abutting or being stacked on the second metal layer 54.

Also in the wavelength conversion element 440 of this modification example, the same effects as in the above-mentioned embodiments can be obtained.

Fourth Modification Example

Next, a wavelength conversion element according to a fourth modification example will be described. This modification example is another form of the third modification example, and the members common to those of the first embodiment are denoted by the same reference numerals, and a detailed description thereof will be omitted.

Figure 9:
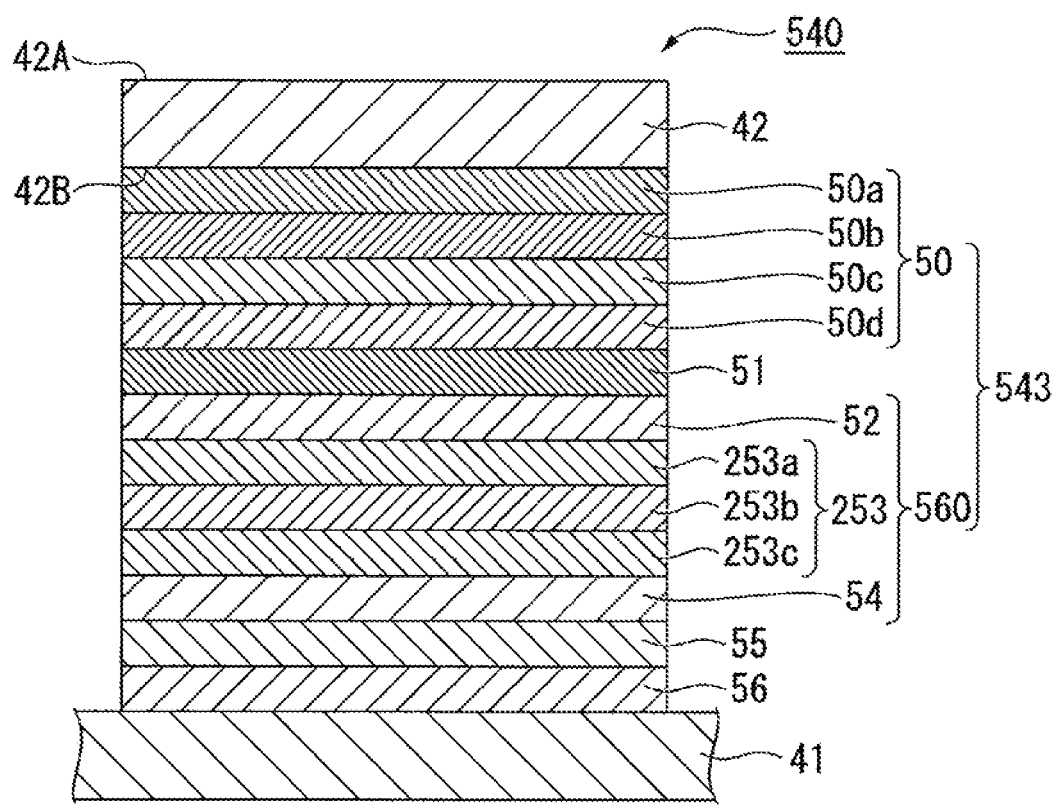
FIG. 9 is a cross-sectional view showing a configuration of a main portion of a wavelength conversion element of a fourth modification example.

FIG. 9 is a cross-sectional view showing a configuration of a main portion of a wavelength conversion element 540 of this modification example. Specifically, FIG. 9 is a view showing the cross section of a reflection member 543.

As shown in FIG. 9, the reflection member 543 of this modification example is constituted by stacking a multilayer film 50, a reflection layer 51, a protective layer 560, and a bonding assisting layer 55. In this modification example, the protective layer 560 includes a first metal layer 52, an inorganic oxide layer 253, and a second metal layer 54.

In this modification example, the inorganic oxide layer 253 has a three-layer structure of a first inorganic oxide layer 253a, a metal layer 253b, and a second inorganic oxide layer 253c. That is, the inorganic oxide layer 253 has a configuration in which the metal layer 253b is sandwiched between two inorganic oxide layers 253a and 253c. As the material of the first inorganic oxide layer 253a, for example, $SiO_2$ was used, and as the material of the second inorganic oxide layer 253c, for example, $Al_2O_3$ was used. As the material of the metal layer 253b coming into contact with $Al_2O_3$, Cr was used.

The inorganic oxide layer 253 may have a structure of three or more layers and may only include at least one inorganic oxide layer.

Also in the wavelength conversion element 540 of this modification example, the same effects as in the above-mentioned embodiments can be obtained.

The invention is not limited to the contents of the above-mentioned embodiments and appropriate modifications are possible without departing from the gist of the invention.

For example, in the above-mentioned embodiments, an example in which the light source device according to the invention is mounted on the projector is shown, however, the invention is not limited thereto. The light source device according to the invention can be applied also to a lighting device, an automobile headlight, etc.

EXAMPLES

The present inventor performed an experiment for confirming the effectiveness of the invention by comparison between Examples and Comparative Example.

In Example 1, the experiment was performed using a unit in which a glass substrate was used in place of a phosphor, and a reflection member was formed on one face of the glass substrate as a sample. In the sample of Example 1, the reflection member having the same configuration as that of the first embodiment was formed on the glass substrate. A Cr film constituting the second metal layer was formed to have a thickness of about 100 nm.

In Example 2, a unit having the same configuration as in Example 1 except that the material of the second metal layer was changed to Ni was used as a sample. A Ni film constituting the second metal layer was formed to have a thickness of about 100 nm.

In Comparative Example, a unit in which the second metal layer was omitted from the configuration of the above-mentioned Examples 1 and 2 was used as a sample. That is, in the sample of Comparative Example, the protective layer is constituted by only the first metal layer and the inorganic oxide layer.

Then, each of the samples of Examples 1 and 2 and Comparative Example was bonded to the substrate and placed in an incubator at 350° C. Then, the reflectance of the reflection member (reflection layer) was measured for each sample after the elapse of 24 hours, 48 hours, and 72 hours in an environment at 350° C. With respect to the retention ratio of the reflectance to the reflectance at 0 hours (reflectance retention ratio), the results are shown in the graphs in FIGS. 10A to 10C. The graphs shown in FIGS. 10A, 10B, and 10C show the reflectance retention ratios for lights having three wavelengths (blue: 465 nm, green: 530 nm, and red: 615 nm), respectively.

Figure 10A:
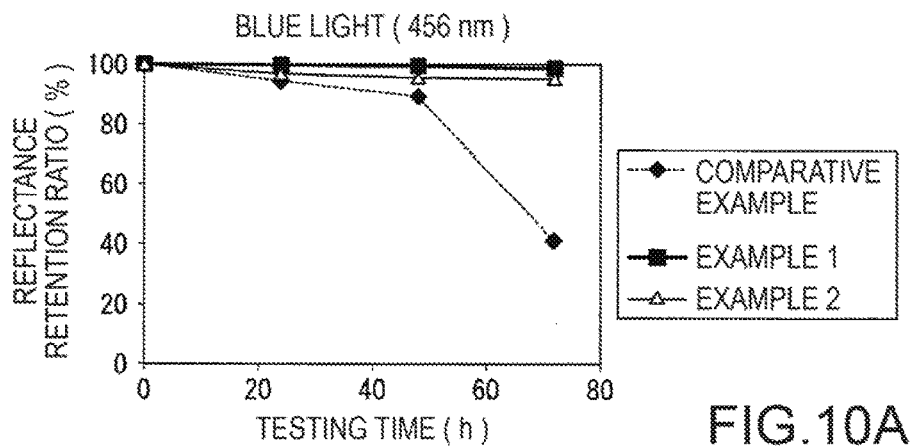
FIG. 10A is a graph showing the results of an experiment of Examples and Comparative Example.
Figure 10B:
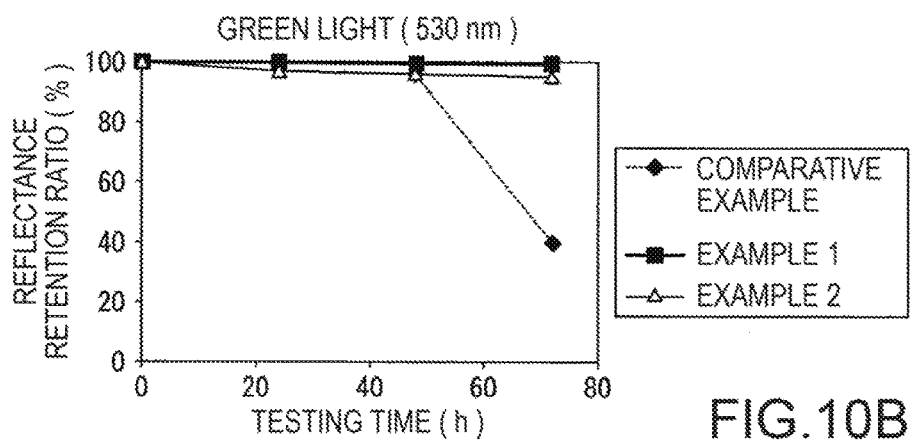
FIG. 10B is a graph showing the results of an experiment of Examples and Comparative Example.
Figure 10C:
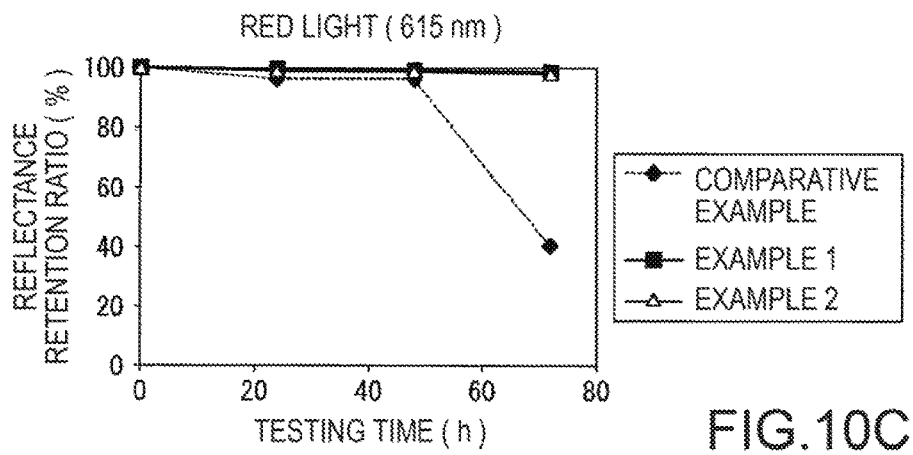
FIG. 10C is a graph showing the results of an experiment of Examples and Comparative Example.

As shown in FIGS. 10A to 10C, it could be confirmed that in Examples 1 and 2, the reflectance retention ratio does not largely change at each wavelength.

On the other hand, it could be confirmed that in Comparative Example, the reflectance retention ratio decreases as time elapses. In particular, it could be confirmed that the reflectance retention ratio sharply drops just after the elapse of 48 hours.

This is because the reflection layer was deteriorated due to the diffusion of ions or oxygen generated from the bonding material after the elapse of hours. Further, it could be confirmed that the reflection layer is partially peeled due to deterioration after the elapse of 72 hours.

That is, it could be confirmed that in Examples 1 and 2 in which the protective layer having a stacked structure of the first metal layer, the inorganic oxide layer, and the second metal layer is included, the deterioration of the reflection layer due to the diffusion of ions or oxygen during bonding can be prevented.

Further, it was confirmed that the second metal layer relieves a pressure generated during bonding, thereby preventing the destruction of the inorganic oxide layer, so that the reliability of the inorganic oxide layer is improved, and thus, the deterioration of the reflection layer in the case of being left at a high temperature for a long period of time can be prevented.

Further, it could be confirmed that the reliability of the inorganic oxide layer is further improved in the case where Cr is used as the second metal layer as compared with the case where Ti is used. That is, it could be confirmed that the deterioration of the reflection layer can be minimized by using Cr as the second metal layer.

The entire disclosure of Japanese Patent Application No. 2017-150598, filed on Aug. 3, 2017 is expressly incorporated by reference herein.

What is claimed is:

1. A wavelength conversion element, comprising: a wavelength conversion layer which has a first face on which an excitation light is incident and a second face facing the first face; a first layer which is provided facing the second face and contains a first inorganic oxide; a second layer which is provided facing the first layer, contains either silver or aluminum, and reflects the excitation light or a light obtained by wavelength conversion of the excitation light by the wavelength conversion layer; a third layer which is provided facing the second layer and contains a first metal other than silver or aluminum; a fourth layer which is provided facing the third layer and contains the first inorganic oxide or a second inorganic oxide that is different from the first inorganic oxide; and a fifth layer which is provided facing the fourth layer and contains the first metal or a second metal that is different from the first metal;

wherein the wavelength conversion element includes a substrate, and the fifth layer and the substrate are bonded to each other by a bonding material provided between the fifth layer and the substrate.

2. The wavelength conversion element according to claim 1, wherein the third layer includes a second layer-side metal layer which is provided on the second layer side, and a fourth layer-side metal layer which is provided on the fourth layer side and contains a material that is different from that of the second layer-side metal layer.

3. The wavelength conversion element according to claim 1, wherein at least one of the third layer and the fifth layer contains any one material of Al, Cr, and Ti.

4. The wavelength conversion element according to claim 1, wherein the wavelength conversion element has a sixth layer which is provided between the fifth layer and the bonding material.

5. A light source device, comprising:
the wavelength conversion element according to claim 1; and
a light source which emits a light toward the wavelength conversion element.

6. A light source device, comprising:
the wavelength conversion element according to claim 2; and
a light source which emits a light toward the wavelength conversion element.

7. A light source device, comprising:
the wavelength conversion element according to claim 3; and
a light source which emits a light toward the wavelength conversion element.

8. A light source device, comprising:
the wavelength conversion element according to claim 4; and
a light source which emits a light toward the wavelength conversion element.

9. A projector, comprising:
the light source device according to claim 6;
a light modulator which modulates a light from the light source device in accordance with image information to form an image light; and
a projection optical system which projects the image light.

10. A projector, comprising:
the light source device according to claim 7;
a light modulator which modulates a light from the light source device in accordance with image information to form an image light; and
a projection optical system which projects the image light.

11. A projector, comprising:
the light source device according to claim 8;
a light modulator which modulates a light from the light source device in accordance with image information to form an image light; and
a projection optical system which projects the image light.

* * * * *